United States Patent
Good

(10) Patent No.: US 7,990,413 B2
(45) Date of Patent: Aug. 2, 2011

(54) CAMERA SENSOR JOB SELECTION METHOD

(75) Inventor: John M. Good, North Andover, MA (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1772 days.

(21) Appl. No.: 11/188,607

(22) Filed: Jul. 25, 2005

(65) Prior Publication Data

US 2006/0095144 A1    May 4, 2006

Related U.S. Application Data

(60) Provisional application No. 60/625,043, filed on Nov. 4, 2004.

(51) Int. Cl.
*H04N 7/18* (2006.01)
(52) U.S. Cl. .......................................... 348/87; 348/126
(58) Field of Classification Search .............. 348/86–95, 348/125–126
See application file for complete search history.

(56) References Cited

U.S. PATENT DOCUMENTS

| 4,389,109 A | 6/1983 | Taniguchi et al. |
| 5,608,453 A * | 3/1997 | Gerber et al. ................... 348/87 |
| 5,649,240 A | 7/1997 | Saegusa |
| 2003/0208773 A1 | 11/2003 | Jotikasthira |

OTHER PUBLICATIONS

Banner Engineering Corp, Presence PLUS Pro, Installation Manual, Jan. 2004, 43 pages, Minneapolis, MN USA.
Banner Engineering Corp, GEO Presense PLUS G4, User's Manual, Jun. 2004, 178 pages.
Sensopart, Area Sensor FA30-1 WCC PA, Operating Manual, Aug. 27, 2003, 30 pages.
IFM Electronic, Efector Dualis, Installation Instructions, Apr. 2004, 16 pages.
International Search Report for PCT Application No. US05/38066 dated Aug. 24, 2007, 11 pages.

* cited by examiner

*Primary Examiner* — Andy S Rao
(74) *Attorney, Agent, or Firm* — Turocy & Watson LLP; William R. Walbrun; John M. Miller

(57) ABSTRACT

Systems and methods are disclosed that facilitate permitting a user to select one of a plurality of job setups stored in a camera sensor. The plurality of job setups can be pre-programmed into the sensor utilizing conventional methods. During sensor operation, a user can select a particular application, and a simple signal can be generated for transmission over existing input/output lines to the camera sensor, upon receipt of which the camera sensor can initiate the particular job setup associated with the signal. Job setup signals can be formatted in binary utilizing HIGH and LOW voltages or can be transmitted as a simple Morse Code message and/or integer value.

25 Claims, 10 Drawing Sheets

CAMERA SENSOR JOB SELECTION METHOD

CROSS-REFERENCE TO RELATED APPLICATIONS

This application claims benefit under 35 U.S.C. §119(e) from U.S. Provisional Patent application Ser. No. 60/625,043 entitled "CAMERA SENSOR JOB SELECTION METHOD" and filed Nov. 4, 2004, the entirety of which is incorporated herein by reference.

TECHNICAL FIELD

The present invention relates generally to industrial control systems, and more particularly to systems and methodologies that facilitate providing an indication of job selection change across extant input/output (I/O) lines associated with a camera sensor that stores a plurality of different job setup configurations.

BACKGROUND OF THE INVENTION

Industrial control systems have enabled modem factories to become partially or completely automated in many circumstances. These systems generally include a plurality of Input and Output (I/O) modules that interface at a device level to switches, contactors, relays and solenoids along with analog control to provide more complex functions such as Proportional, Integral and Derivative (PID) control. Communications have also been integrated within the systems, whereby many industrial controllers can communicate via network technologies such as Ethernet, Control Net, Device Net or other network protocols and also communicate to higher level computing systems. Generally, industrial controllers utilize the aforementioned technologies along with other technology to control, cooperate and communicate across multiple and diverse applications.

Conventional control systems employ a large array of varied technologies and/or devices to achieve automation of an industrial environment, such as a factory floor or a fabrication shop. Systems employed in an automated environment can utilize a plurality of sensors and feedback loops to direct a product through, for example, an automated assembly line. Such sensors can include temperature sensors (e.g., for determining a temperature of a steel bar that is entering a roller device to press the bar into a sheet . . . ), pressure sensors (e.g., for determining when a purge valve should be opened, for monitoring pressure in a hydraulic line . . . ), proximity sensors (e.g., for determining when an article of manufacture is present at a specific device and/or point of manufacture . . . ), etc.

Proximity sensors are available in a wide variety of configurations to meet a particular user's specific sensing needs. For example, sensors can be end-mounted in a housing, side-mounted in a housing, etc., to facilitate mounting in confined spaces while permitting the sensor to be directed toward a sensing region as deemed necessary by a designer. Additionally, proximity sensors are available with varied sensing ranges, and can be shielded or unshielded. Shielded inductive proximity sensors can be mounted flush with a surface and do not interfere with other inductive proximity sensors, but have diminished sensing range when compared with unshielded proximity sensors.

Various types of proximity sensors are used for detecting the presence or absence of an object. Common types of non-contact proximity sensors include inductive proximity sensors, capacitive proximity sensors, ultrasonic proximity sensors, and photoelectric sensors. Such sensors, for example, may be used in motion or position applications, conveyor system control applications, process control applications, robotic welding applications, machine control applications, liquid level detection applications, selecting and counting applications, as well as other known applications.

In photoelectric sensors (e.g., optoelectronic sensory, and/or photocell), for example, basic optic functions can be utilized for common object detection (e.g., through beam, retroreflex, and proximity). In one example, a photoelectric sensor includes basic elements such as, for example, a photo-emitter, an optic system, a photo-receiver, a demodulator-amplifier, a comparator, and a transistor. The photo-emitter converts a modulated electric signal into luminous energy pulses that are distinct from other light sources. The photo-emitter and a receiver can be connected in an optic system by, for example, a light beam wherein variations are elaborated to detect an object. The received luminous energy is converted into an electronic signal by, for example, a photo-receiver. After the conversion, a demodulator-amplifier extracts and amplifies part of the signal originated by the modulated light emitter. The comparator can compare the received signal and a switching threshold. Furthermore, a transistor or relay power output drives an external actuator direct the load.

However, there is a trend in industrial technology to replace traditional mechanical gauging or sensor technology with cost-saving, easy-to-use vision sensors. A single vision sensor can supersede measurement sensors, proximity, and photoelectric sensor arrays, or mechanical gauges in performing inspection and/or measurement. For example, a vision sensor can be, but not limited to, a low end vision system, a vision camera, camera sensor, and/or smart camera. General benefits of vision sensors over traditional mechanical gauging and sensor technology include: lower costs for installation, calibration, and maintenance; online accessibility to add new inspections and/or measurement capabilities; quality and efficiency; and improved functionality.

Typically, vision sensors are available in two hardware configurations—an all-in-one "smart camera" and a remote camera. The smart camera is a standalone unit where a light source, lens, camera, and processor/controller are in a single package. To the contrary, the remote camera is a separate unit containing the remote camera, lens, and light source while the processor/controller is separately contained. While the smart camera can act as a standalone unit with I/O or communication outputs, and give a slight increase in speed based upon the lack of cable transmission for the processor/controller; however, the remote camera is more compact and can locate I/O wiring in a controller housing separate from the remote camera.

Furthermore, each hardware configuration provides associated software in order to mitigate setup and configuration. Traditional software utilizes a pushbutton interface in order to "teach" the sensor bad and/or good parts allowing self-contained configuration. For example, the pushbutton interface is utilized to teach the vision sensor pattern matching, presence/absence, and/or feature comparison, wherein the pushbutton designates a "perfect model" to which a pass or fail judgment is made. Another self-contained configuration mode utilizes a drop-down menu or interface allowing customized configuration capability for individual settings or changes tailored to each measurement and/or inspection. Regardless of the configuration mode and/or interface chosen, pass or fail determinations are simply binary without extrinsic or correlated data.

As industrial control systems become more complex and as system demands require finer-tuned sensing devices, so too does vision sensor efficiency become ever more important. Thus, a need exists in the art for systems and methods that facilitate increasing efficiency with regard to vision sensor setup and sensing operability.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The subject invention provides for systems and methods that facilitate providing an indication of a change in job selection in a camera sensor via a simple signal that is broadcast over existing input/output (I/O) lines to the camera sensor. According to an aspect of the invention, a plurality of job setups (e.g., applications, . . . ) can be pre-programmed into the camera sensor to facilitate transition between job setups during sensor operation without requiring down time for reprogramming of the sensor between jobs. The camera can be outfitted with sufficient memory to store the plurality of job setups. A user can select a particular job setup via, for example, a user interface, and a signal can be generated that is indicative of the selected job setup. The signal can be transmitted over existing I/O lines to cause the camera sensor to change from a first job setup to a second job setup that is already stored in the sensor. For example, a sensor that is operatively coupled to two I/O lines can receive four different signal combinations (e.g., 00, 01, 10, and 11), each of which can be assigned to a different job setup. If desired, "00" can be assigned to a default job setup that can be initiated, for example, upon sensor startup in the absence of a user-selected job setup. If three I/O lines are connected to the sensor, then a total of eight unique job setup signals are possible, etc.

According to a related aspect of the subject invention, Morse Code can be employed to transmit a simple message to the camera sensor. Upon user selection, a message associated with a selected job setup can be generated and transmitted to the sensor to cause initiation of the selected job setup. For example, a default setup can be assigned an integer value of "0", which can be transmitted in Morse as five dashes (e.g., "- - -"). A first selectable non-default job setup can be associated with an integer value of "1," represented as "* - - -" in International Morse Code. The Morse signal can be tonal (e.g., a series of dits and/or dahs, . . . ) or can be a series of electrical pulses of appropriate duration and spacing, or any other suitable means for transmitting a signal in Morse Code. Additionally, the invention can employ International Morse Code and/or American Morse Code as desired by a user.

To the accomplishment of the foregoing and related ends, certain illustrative aspects of the invention are described herein in connection with the following description and the annexed drawings. These aspects are indicative, however, of but a few of the various ways in which the principles of the invention can be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
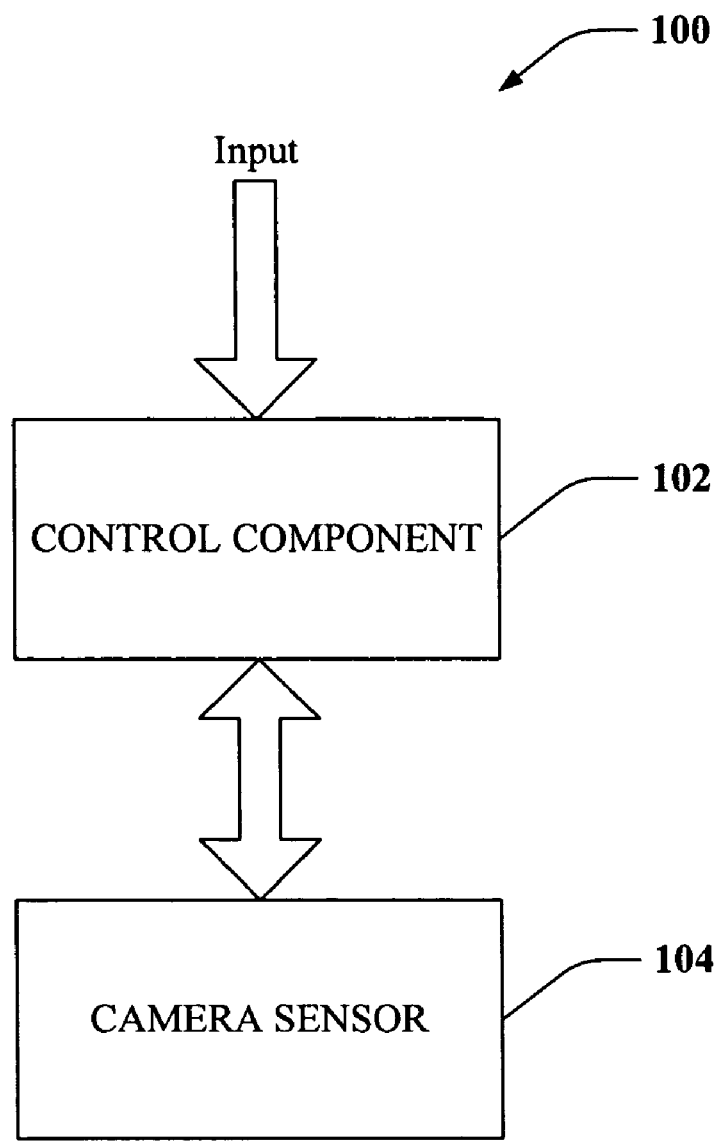
FIG. 1 is an illustration of a system 100 that facilitates changing an application (e.g., "job") running in a camera sensor via transmission of a simple signal over existing input/output (I/O) lines while mitigating delays caused by sensor operation cessation during job setup periods, in accordance with an aspect of the subject invention.

The present invention will now be described with reference to the drawings, wherein like reference numerals are used to refer to like elements throughout. The present invention will be described with reference to systems and methods for permitting a user to select one of a plurality of job setup applications stored in a camera sensor. It should be understood that the description of these exemplary aspects are merely illustrative and that they should not be taken in a limiting sense.

As used in this application, the terms "component," "handler," "model," "system," and the like are intended to refer to not only a mechanical, but also a computer-related entity, for example either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal).

It is to be appreciated that various aspects of the present invention can employ technologies associated with facilitating unconstrained optimization and/or minimization of error costs. Thus, non-linear training systems/methodologies (e.g., back propagation, Bayesian, fuzzy sets, non-linear regression, or other neural networking paradigms including mixture of experts, cerebella model arithmetic computer (CMACS), radial basis functions, directed search networks, custom integrated circuits and function link networks) can be employed.

FIG. 1 is an illustration of a system 100 that facilitates changing an application (e.g., "job") running in a camera sensor via transmission of a simple signal over existing input/output (I/O) lines while mitigating delays caused by sensor operation cessation during job setup periods, in accordance with an aspect of the subject invention. As used herein, "job" is synonymous with "program," "application,' etc., such as are commonly referred to when describing computer function(s). For example, a signal can be generated based at least in part on user desires, and the signal can be transmitted to a sensor to cause the sensor to change from one job to another. Subsequent job setups can be run on a single product type or can be employed to inspect different products. The system 100 comprises a control component 102 that receives an input signal from a user and converts received information into a simple signal that can be transmitted to a sensor 104 to induce the sensor 104 to terminate a first job and initiate a second job. For example, if the sensor 104 is connected to the control component 102 by two input lines, then four possible input signals can be received by the sensor 104, each of which can indicate a different application, or job. To further this example, if the control component 102 is operatively connected to the sensor 104 via twisted pair input lines, then four possible binary combinations can be transmitted from the control component 102 to the sensor 104 (e.g., 01, 10, 11, and 00). If desired, "00" can be assigned to a default application, such that when the sensor 104 receives a 00 input, the default application will be executed. Thus, the control component 102 can transmit, for instance, a LOW voltage signal across each of a first and second input line to the sensor 104 to provide a default 00 signal thereto. It is to be appreciated that discussion herein of LOW and HIGH voltage levels is intended to indicate the voltage levels with respect to each other, and, thus, any suitable voltages can be employed as will be appreciated by one skilled in the art.

If a user desires to change a job setup from the default setup to a first non-default setup, the user can select such a setup via, for instance, a user interface (not shown), in order to provide input to the control component 102. The control component 102 can then generate and transmit a LOW signal across the first input line to the sensor 104 and a HIGH signal across the second input line to provide a "01" signal to the sensor 104. Upon receiving the "01" signal, the sensor can initiate the non-default job setup. Similarly, if a user selects a second non-default setup, then the control component 102 can generate and transmit HIGH and LOW signals respectively across the first and second input lines to the sensor 104 to provide a "10" signal. Still furthermore, if a user selects a third non-default job setup, then the control component 102 can transmit HIGH voltage signals across both input lines to the sensor 104 to provide a "11" signal thereto. In each case, the camera sensor 104 can initiate a particular job setup, or program, associated with the signal received from the control component 102.

It is to be appreciated that the voltages employed by the control component 102 can be inverted with respect to the binary values represented thereby, such that a LOW voltage can be employed to generate a true outcome, or "1," (e.g., a "LOW-true") and a HIGH voltage can generate a false (e.g., "0") outcome, as will be appreciated by one skilled in the art.

Moreover, the control component 102 can attach a header or prefix to the job selection signal in order to alert the sensor 104 that the immediately following input relates to job selection and/or changes thereto. It is to be appreciated that the subject invention is not limited to two input lines and thus four job setup configurations, but rather can have any suitable number of input lines (e.g., 3, 4, 5, . . . ) and a corresponding number of job setup configurations as permitted by the associated number of input signal combinations.

Additionally, the subject invention can employ any suitable means for transmitting a signal indicative of a job selection change. For example, Morse Code is a system of signal transmission that can be employed by the system 100 to facilitate expression of a user's desire to change a job selection. This aspect of the invention can provide a relatively simple signaling schema, which in turn permits rapid generation of job change signals by the control component 102 for transmission to the sensor 104. For example, a default signal might be associated with a Morse "0," represented by five consecutive dashes (e.g., "- - - - -") in both American Morse Code and International Morse Code. Such a signal can induce the sensor to initiate a default job application, although the system 100 is not limited to utilizing a "0" signal to indicate a default job selection, but rather can use any suitable signal value.

Similarly, a first non-default job setup selection can be indicated by transmission of a "1" by the control component 102 to the sensor 104. Such value is represented as a "* - - - -" in International Morse Code, and as a "* - - - *" in American Morse Code. A second non-default job setup can be triggered via transmission of a "2" (e.g., " - - -" in International Morse; "-**" in American Morse), and so on, such that any desired number of job setup selections can be represented and/or selected via an associated numerical value transmitted in Morse Code. It is to be appreciated that either International Morse Code or American Morse Code can be employed by the subject invention, and that implementation of either form of Morse Code as a signaling vehicle is intended to fall within the scope and spirit of the subject invention.

Job setups (e.g., tasks) associated with a sensor such as the camera sensor 104 can be numerous and diverse. For example, presence/absence applications, basic dimensioning applications, etc., can require that the sensor 104 operate in a high-contrast mode, which can comprise employing backlighting, front-lighting, etc. Additionally, high-contrast imagery job setups can employ binary (e.g., black-and-white) imaging to count pixels. Jobs that require pattern matching, feature detection, defect detection, etc., can employ, for example, gray scale detection techniques. Furthermore, the sensor 104 can employ color detection techniques, for instance, to isolate features according to color and then inspect via presence/absence techniques based on color, etc. The camera sensor 104 can be a smart camera sensor, which comprises a camera, light source, lens, processor, memory, etc., in a single unit to facilitate employing any and all of the above techniques via a single sensing unit.

According to an example, a default job setup can be set to perform a binary imaging technique on, for example, an assembly line via which labeled bottles are moved past the sensor 104. The binary imaging technique can be employed to determine whether labels on passing bottles are correctly oriented. However, a user (e.g., quality control personnel, assembly line operator, . . . ) may notice that although the labels appear to be oriented properly, a hue associated with a color in the labels is not correct (e.g., the color exhibits an undesirable brightness, dimness, . . . ). At this point, the user can select a different job setup in order to determine whether the user's observation is in fact accurate. For instance, the user can select (e.g., via a push-button control panel, a graphical user interface such as a computer monitor, PDA, touch-screen display, cell phone, . . . ) to initiate a first non-default job setup to assess the hues of colors in the label. Thus, with the click of a mouse, stylus, button, etc., the user can prompt the control component 102 to send a simple signal (e.g., by I/O lines, wireless channel, Morse Code, . . . ) to the sensor 104, which will switch to the first non-default job setup upon receipt of the signal. The first non-default job setup can be, for example, a gray scale detection technique that is employed to determine a shade of gray associated with each pixel in an image captured by the sensor 104. The user can then assess whether color hues in the labels are within a target tolerance based on error signals and/or failed images generated by the sensor 104 and/or control component 102 regarding pixel values that deviate from a preset target value (e.g., as determined during a teaching period wherein the sensor is programmed with information related to identifying acceptable images and unacceptable images.

To further this example, a user may notice that although the orientation of the labels is correct, a slight smear is detectible in an image printed thereon. The user can select a second non-default job setup to assess whether the defect in the label warrants rejection/removal of the product from the assembly line. For instance, the user can provide an input to the control component 102 (e.g., via a user interface, . . . ) to initiate the second non-default job setup in a manner similar to that described above. The camera sensor 104 can then initiate the second job setup, which is already stored in the sensor 104 and provide information related to, for example, color shift, color definition, presence/absence of a feature on the label, etc. In this manner, a user can switch between job setups (e.g., specific tasks, techniques, employment thereof, . . . ) without having to endure the delays associated with job setup changes in conventional sensors (e.g., sensor downtime during job setup change, reprogramming, teaching, . . . ). Such is achieved in part via providing the sensor 104 with sufficient memory to store a plurality of different job setups and permitting a user to transmit a simple signal to instruct the sensor 104 to change from one job setup to another. Moreover, the subject invention permits communication and execution of user desires over existing I/O lines (e.g., twisted pair, cable, wireless, . . . ), which mitigates system complexity and facilitates rapid integration of the system 100 into extant manufacturing plants, fabrication environments, etc.

Figure 2:
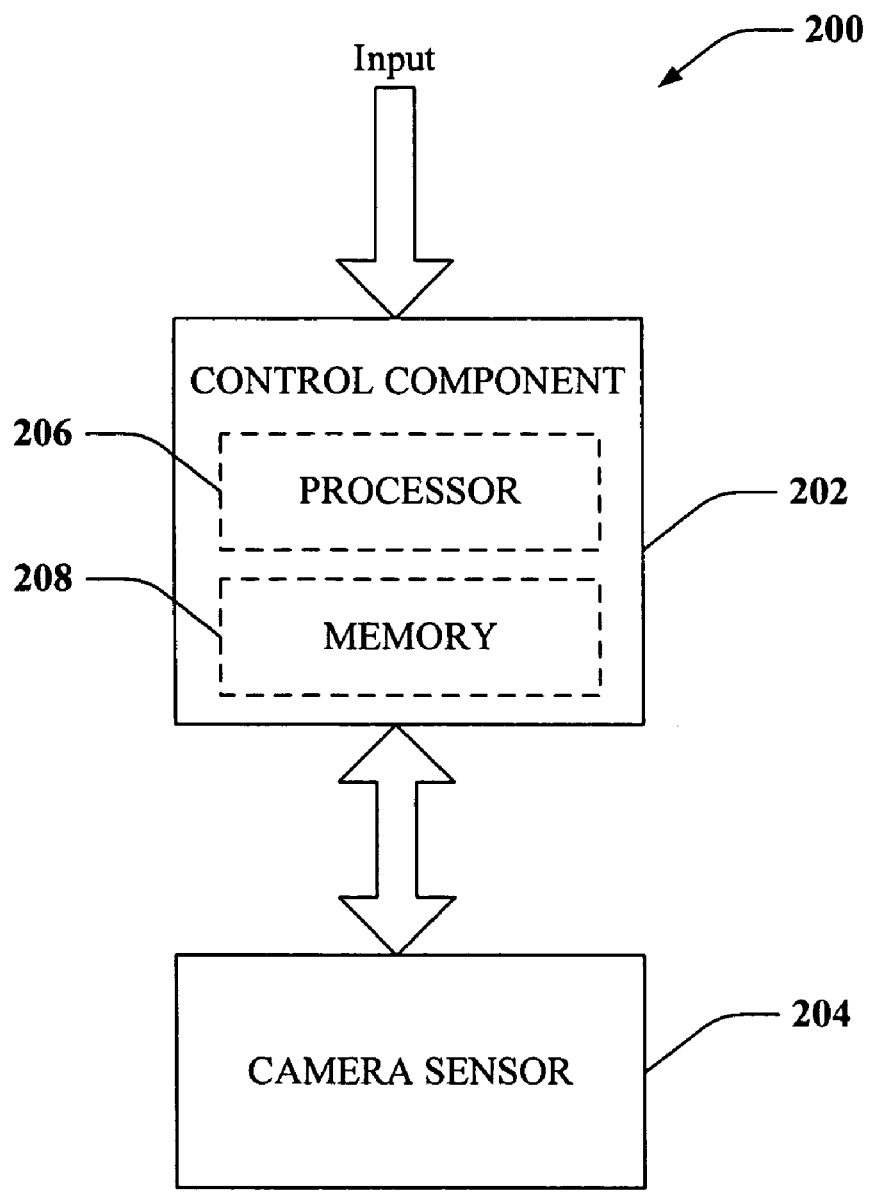
FIG. 2 is an illustration of a system 200 that facilitates signaling a sensor to change a job setup selection in accordance with an aspect of the subject invention.

FIG. 2 is an illustration of a system 200 that facilitates signaling a sensor to change a job setup selection in accordance with an aspect of the subject invention. The system 200 comprises a control component 202 that is operatively coupled to a camera sensor 204. The control component 202 can be connected to the sensor 204, via, for instance, a twisted pair connection that permits four input combinations to be transmitted from the control component 202 to the sensor 204. It is to be appreciated that the control component 202 and the sensor 204 can be connected via any suitable means, such as, for example, a wireless connection, and Ethernet connection, a telephone line, etc., and that the subject invention is not limited to employing a twisted pair connection, whether single or multiple pairs. Moreover, the system 200 can employ any suitable means to transmit a signal from the control component 202 to the sensor 204. The control component 202 comprises a processor 206 and a memory component 208. The processor 206 analyzes information received from, for example, an input component (not shown) such as a user interface, through which a user can indicate that a job selection change is desired.

The processor 206 can additionally facilitate generation of an appropriate signal for transmission to the sensor 204. For example, the processor can generate information related to voltages (e.g., LOW, HIGH, . . . ) to be transmitted over extant I/O connection(s) to the sensor 204 in order to provide a binary signal to the sensor 204. Alternatively, the processor 206 can facilitate generating electrical signals such as are employed in conjunction with Morse Code (e.g., electrical pulses, tonal/aural pulse patterns, . . . ) to facilitate providing a job setup selection signal to the sensor 204. It is to be understood that the processor 206 can be a processor dedicated to signal generation, a processor used to control one or more of the components of the system 200, or, alternatively, a processor that is both used to generate signals based on user input, and to control one or more of the components of the system 200. The memory component 208 can be employed to retain information associated with user input, signal generation, and/or any other information related to the system 200.

Furthermore, the memory 208 can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EE-PROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 208 of the present systems and methods is intended to comprise, without being limited to, these and any other suitable types of memory.

Figure 3:
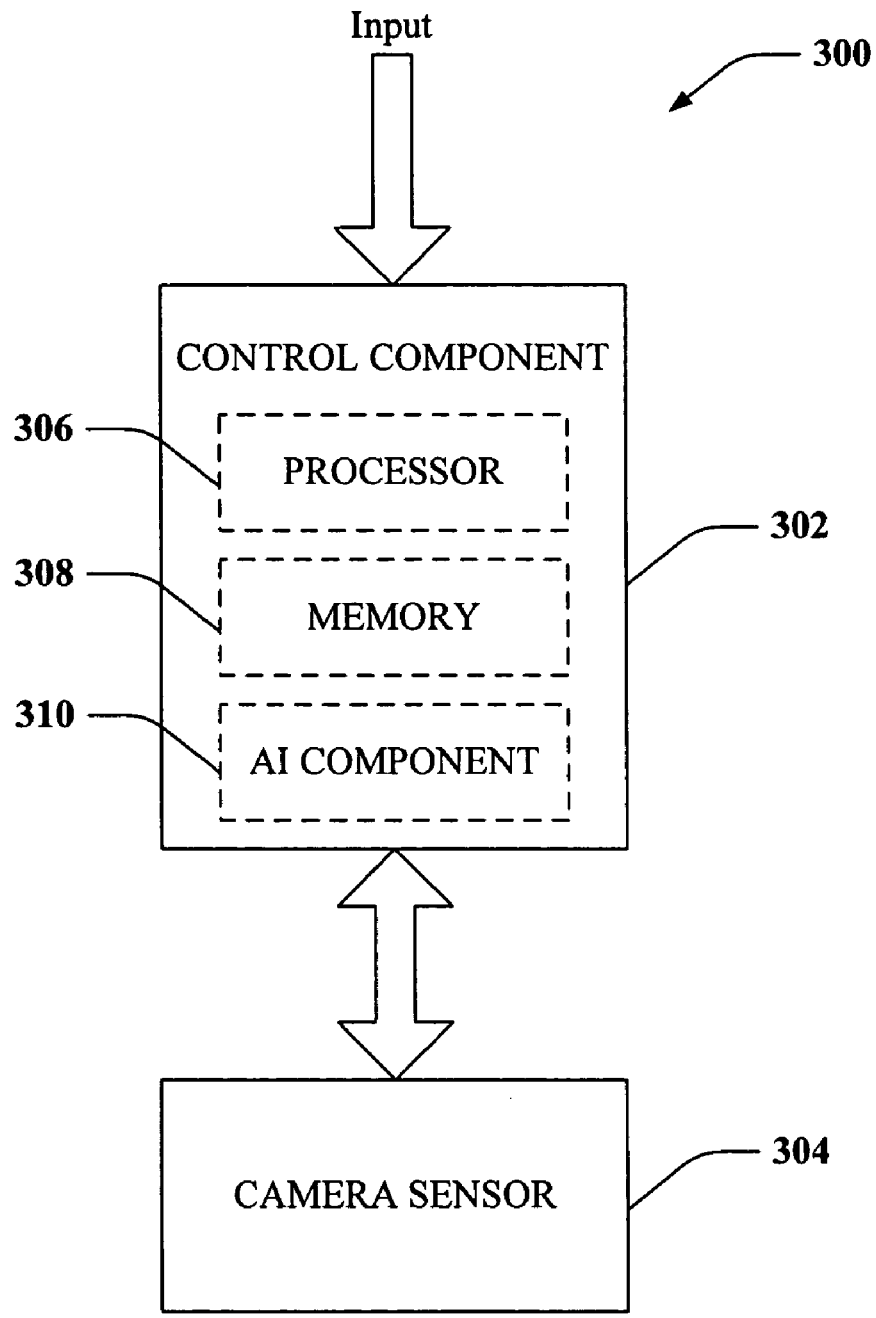
FIG. 3 is an illustration of a system 300 that facilitates permitting a user to remotely select a job setup change in a camera sensor using existing I/O lines in accordance with an aspect of the subject invention.

FIG. 3 is an illustration of a system 300 in accordance with an aspect of the subject invention. The system 300 can employ various inference schemes and/or techniques in connection with job setup selection, changes thereof, signal generation and/or transmission, etc. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject invention.

Still referring to FIG. 3, a system 300 is illustrated that facilitates permitting a user to remotely select a job setup change in a camera sensor using existing I/O lines in accordance with an aspect of the subject invention. The system 300 comprises a control component 302 that controls one or more components of the system 300 and facilitates analysis of information germane to operation of the system 300. The control component 302 is operatively coupled to a camera sensor 304 that can store a plurality of job setup applications, which are selectable via a simple input signal from the control component 302. The control component 302 further comprises a processor 306 and a memory 308, as described supra with respect to FIG. 2. Additionally, the control component 302 can comprise an artificial intelligence (AI) component 310 that can make inferences regarding system operation, imaging conditions, imaging techniques related to performing a user-specified task, etc. It is to be appreciated that the sensor 304 can comprise a processor, memory, and/or AI component as well, in addition to those depicted as part of the control component 302, in order to facilitate system function and/or employment of any of the various methodologies described herein.

For example, the AI component 310 can infer an appropriate imaging technique in response to a user's indicated job setup selection. To further this example, the sensor 304, for instance, can run a job setup such as a basic dimensioning application to count pixels in a label on a package. A user (e.g., system operator, quality control personnel, ...) can desire to inspect a specific pattern within the label, and can so indicate via clicking on an icon associated with such a task on a graphical interface (not shown) associated with the system 300. Once the user selects the job, the AI component 310 can infer an appropriate imaging technique to employ in order to achieve the desired task. For instance, in the present example, the AI component 310 can determine that a gray scale technique will enable the system 300 to provide the user with the desired information, and can provide such determination to the control component 302 to assist the control component 302 in generating an appropriate signal for transmission to the sensor 304. Once the sensor 304 receives the control signal, the sensor can initiate a stored job setup associated with the user's request.

According to a related example, the user can be provided with an override option, such that when the AI component 310 makes an inference regarding employing a specific imaging technique, based at least in part on the user's indication of a desired job setup, the user can be prompted to approve or reject the suggested imaging method (e.g., via a user interface, a n audio signal, ...). For instance, the sensor 304 can operate in a color detection mode while performing a first task. When a user indicates a preference for a change in job setup to a second task that can be performed utilizing either color detection imaging techniques or gray scale imaging techniques, the AI component 310 can infer that employing a gray scale technique will suffice to perform the indicated job more efficiently (e.g., more quickly, consuming fewer system resources, ...) than other methods while providing adequate information, and the user can be alerted to the inference via a user interface prior to transmission of a control signal to the sensor 304. If the user desires that the sensor perform the indicated second task using a color detection technique, then the user can override (e.g., click on an "override" icon presented to the user, ...) the inference and the control component 302 can instruct the sensor to initiate a pre-stored job setup that performs the indicated task via a color detection technique. It is to be appreciated that the preceding discussion regarding the AI component 310 is exemplary in nature, and is not intended to limit the scope of the manner in which the AI component 310 makes inferences or the number of inferences that can be made by the AI component 310.

Figure 4:
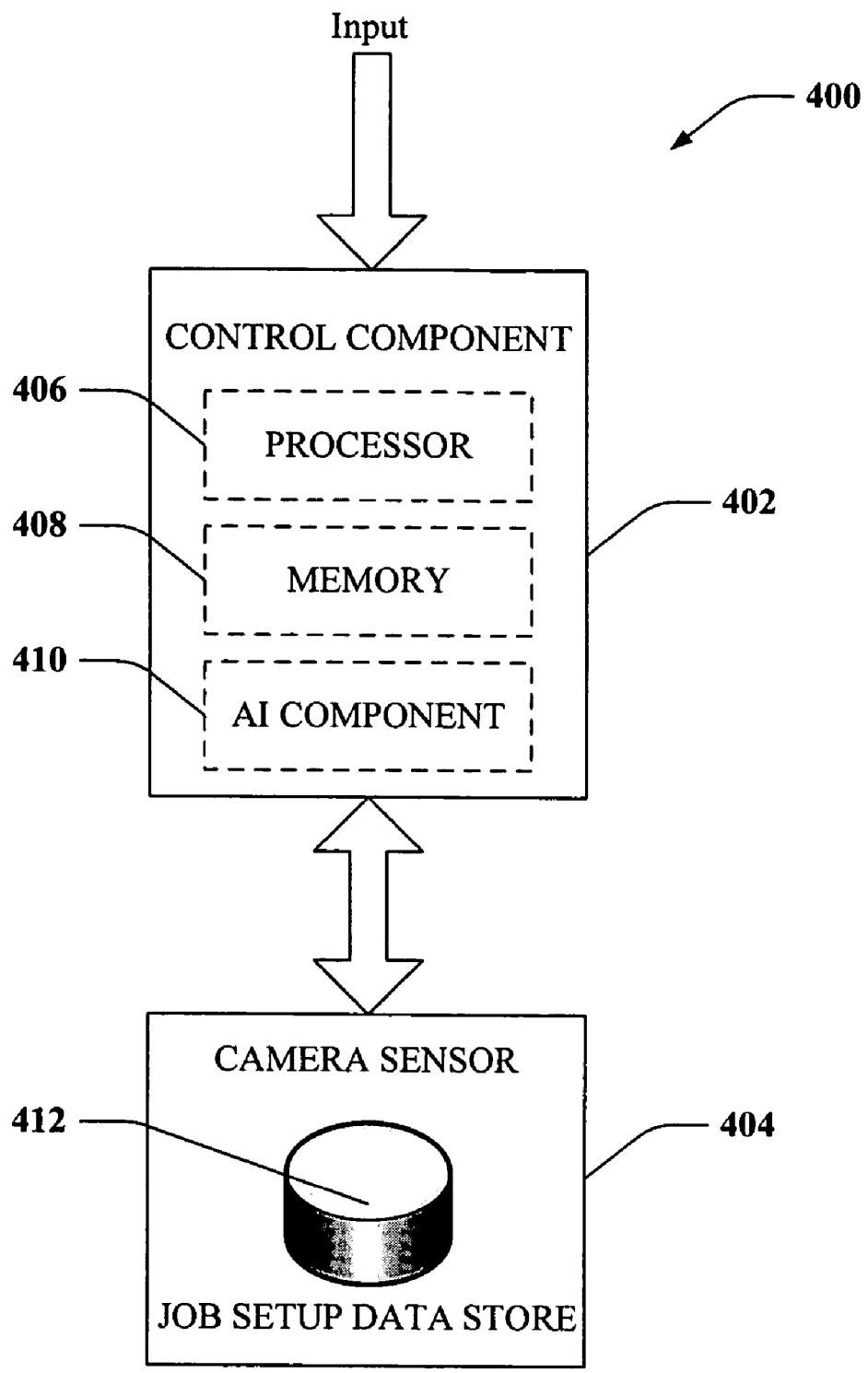
FIG. 4 is an illustration of a system 400 that facilitates reducing job setup change time by providing pre-stored job setup instructions (e.g., code, . . . ) in a camera sensor in accordance with an aspect of the subject invention.

FIG. 4 illustrates a system 400 that facilitates reducing job setup change time by providing pre-stored job setup instructions (e.g., code, ...) in a camera sensor in accordance with an aspect of the subject invention. The system 400 comprises a control component 402 that is operatively coupled to a camera sensor 404. The control component comprises a processor 406 that analyses information germane to the operation of the system 400 and/or to control of job setup selection in the sensor 404, and a memory component 408 that stores information related to system 400 operation and/or job setup configuration, signals, etc. The system 400 further comprises an AI component 410 that can make inferences regarding system 400 operation as discussed supra with respect to FIG. 3.

The sensor 404 comprises a job setup data store 412 that can retain instructions, code, etc., for implementation of a plurality of job setups. For example, the job setup data store 412 can store a plurality of programs associated with jobs that can be performed by a first imaging technique, such as a binary imaging technique. The job setup data store 412 can additionally store a second plurality of programs associated with jobs that can be performed via implementation of a second imaging technique, such as gray scale imaging. Similarly, a third plurality of programs associated with jobs that can be performed utilizing a third imaging technique (e.g., color detection, ...) can be stored in the job setup data store 412. It is to be appreciated that the job setup data store can comprise sufficient memory to permit storage of any number of job setups, or programs, associated with any desired number of jobs or tasks, and with any number of imaging techniques that can be utilized in conjunction with the camera sensor 404 (e.g., a vision sensor, a smart camera sensor, ...), as will be appreciated by one skilled in the art, and is not limited to the techniques and/or jobs set forth above. Moreover, it will be appreciated that one or more techniques can be suitable to perform a desired job as selected by a user. Accordingly, the job setup data store 410 can retain a plurality of job setups for performing a single job (e.g., a first setup for performing a job with a first imaging technique, a second job setup for performing a job utilizing a second imaging technique, ...). Such alternate job setups can be arranged as primary and secondary setups based on, for instance, efficiency, operability of the system (e.g., in the event that the first imaging technique is unavailable due to an inoperable system component, ...), etc. Additionally, setup preferences can be programmed by a user in an initial sensor programming period.

The job setups stored in the job setup data store 412 can be programmed into the data store 412 utilizing conventional programming methods such as are employed when programming a single job setup into a sensor. Unlike conventional sensor arrangements, the system 400 permits a large number of selectable job setups to be programmed into the data store 412 during an initial programming phase, which can later be selected by a user and implemented without having to cease sensor operation for reprogramming in between jobs. Additionally, the sensor 404 is instructed to change a job setup selection via existing I/O lines (e.g., whether physical lines or wireless), thus facilitating integration of the system 400 into existing fabrication environments.

Figure 5:
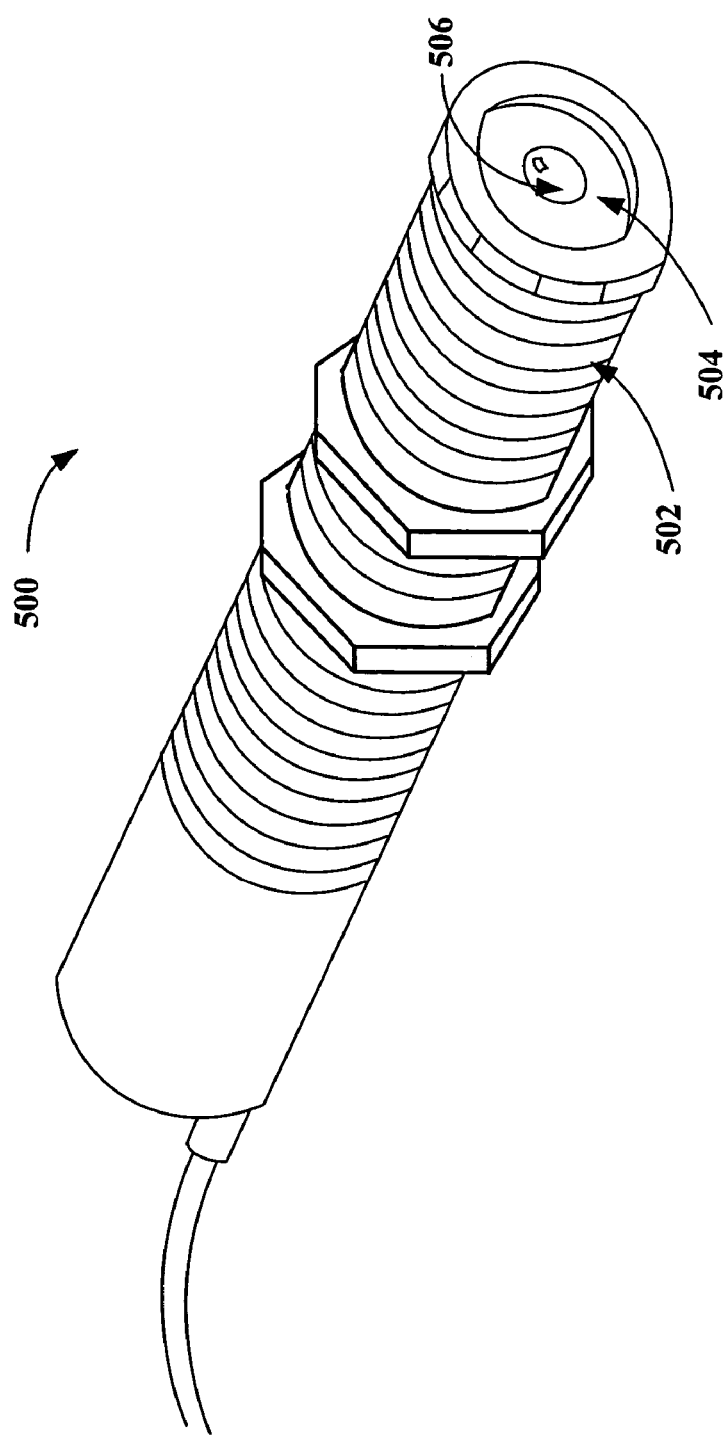
FIG. 5 is an illustration of an exemplary camera sensor 500 that can be employed in conjunction with the systems and methodologies described herein.

FIG. 5 is an illustration of an exemplary camera sensor 500 that can be employed in conjunction with the systems and methodologies described herein. It will be appreciated that other camera sensor configurations, smart cameras, etc., can be employed by the subject invention, and that the invention is not limited to the particular camera sensor configuration depicted in FIG. 5. The sensor 500 comprises a sensor housing 502 with a sensor face 504. A camera lens 506 can be seen through the sensor face 504. The sensor housing can encompass functional hardware such as a digital camera, a processor, a memory component, and AI component, etc., as described with reference to the preceding figures. Additionally, the sensor 500 can comprise a light source, a timing trigger, and the like, as are commonly associated with an all-in-one camera sensor.

The camera sensor 500 can be programmed by utilizing conventional sensor programming methods. However, in contrast to conventional camera sensors, the camera sensor 500 can store a plurality of individual job setup programs, such that the sensor can switch between job setups without requiring that the sensor be shut down and/or reprogrammed between jobs. Additionally, I/O lines 508 associated with the sensor can be employed to signal the sensor that a user desires a job setup change. For example, a user can select a job setup via a user interface, and the sensor can be signaled via electrical pulses that result in a simple binary signal, a Morse Code signal, etc., wherein each binary and/or Morse value identifies a particular job setup stored in the sensor. Upon receipt of the control signal, the sensor can initiate the desired job setup.

Figure 6:
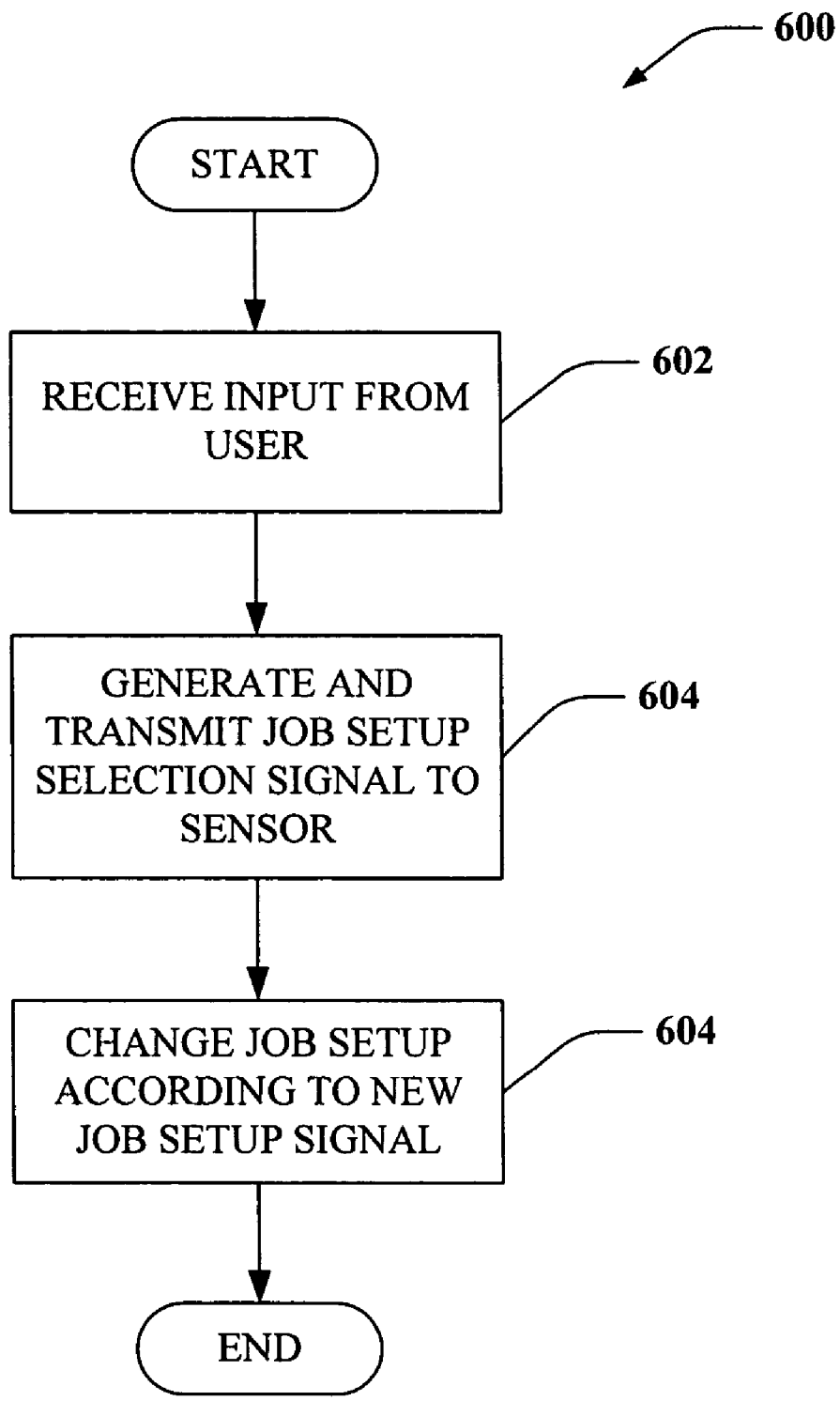
FIG. 6 is an illustration of a methodology 600 for permitting a user to select a job setup change via transmission of a simple control signal to a camera sensor in which a plurality of job setups are stored in accordance with an aspect of the invention.
Figure 7:
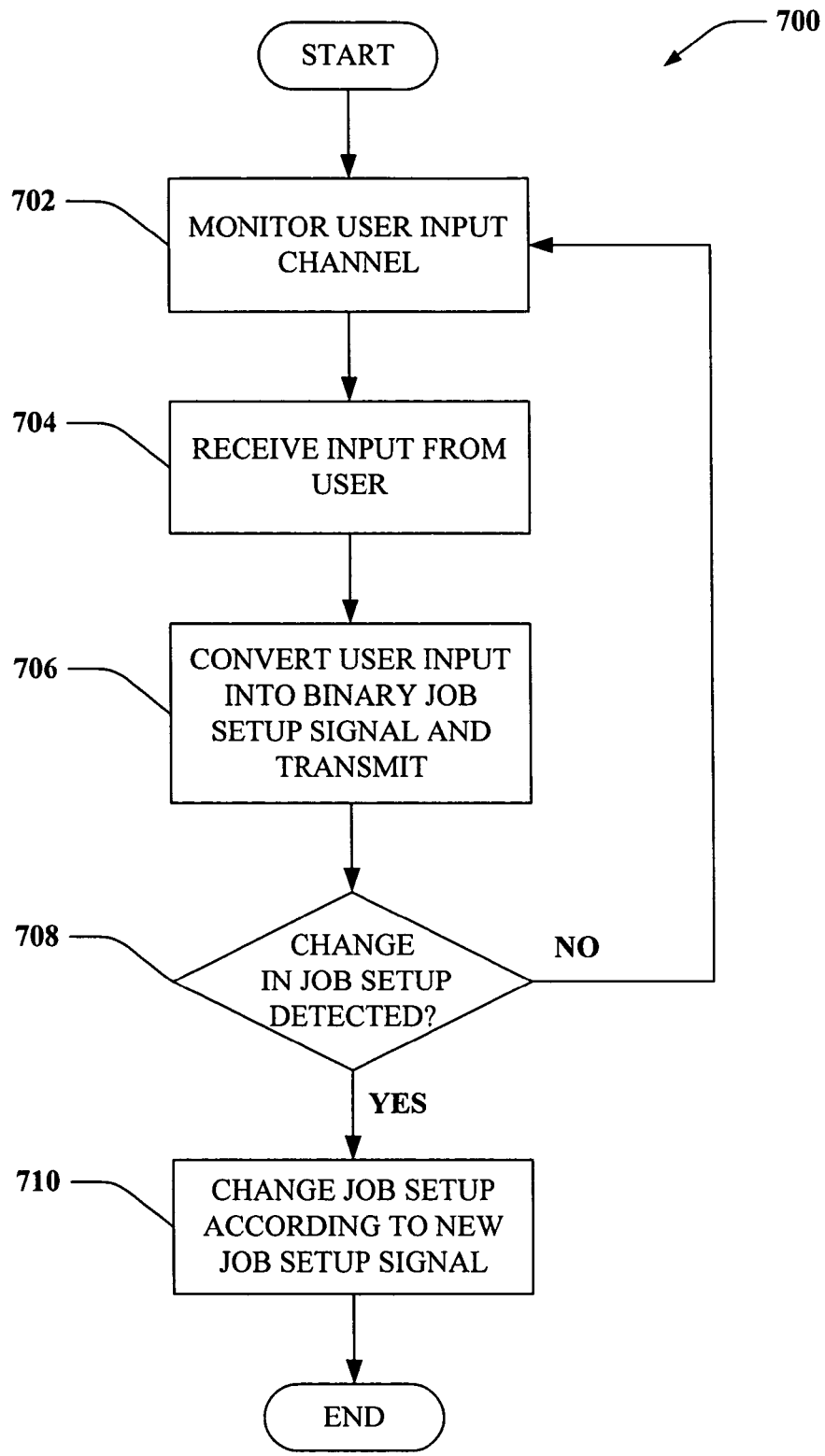
FIG. 7 is an illustration of a methodology 700 for changing a job setup in a camera sensor without requiring cessation of sensor operation and/or reprogramming of the sensor between jobs, in accordance with an aspect of the subject invention.
Figure 8:
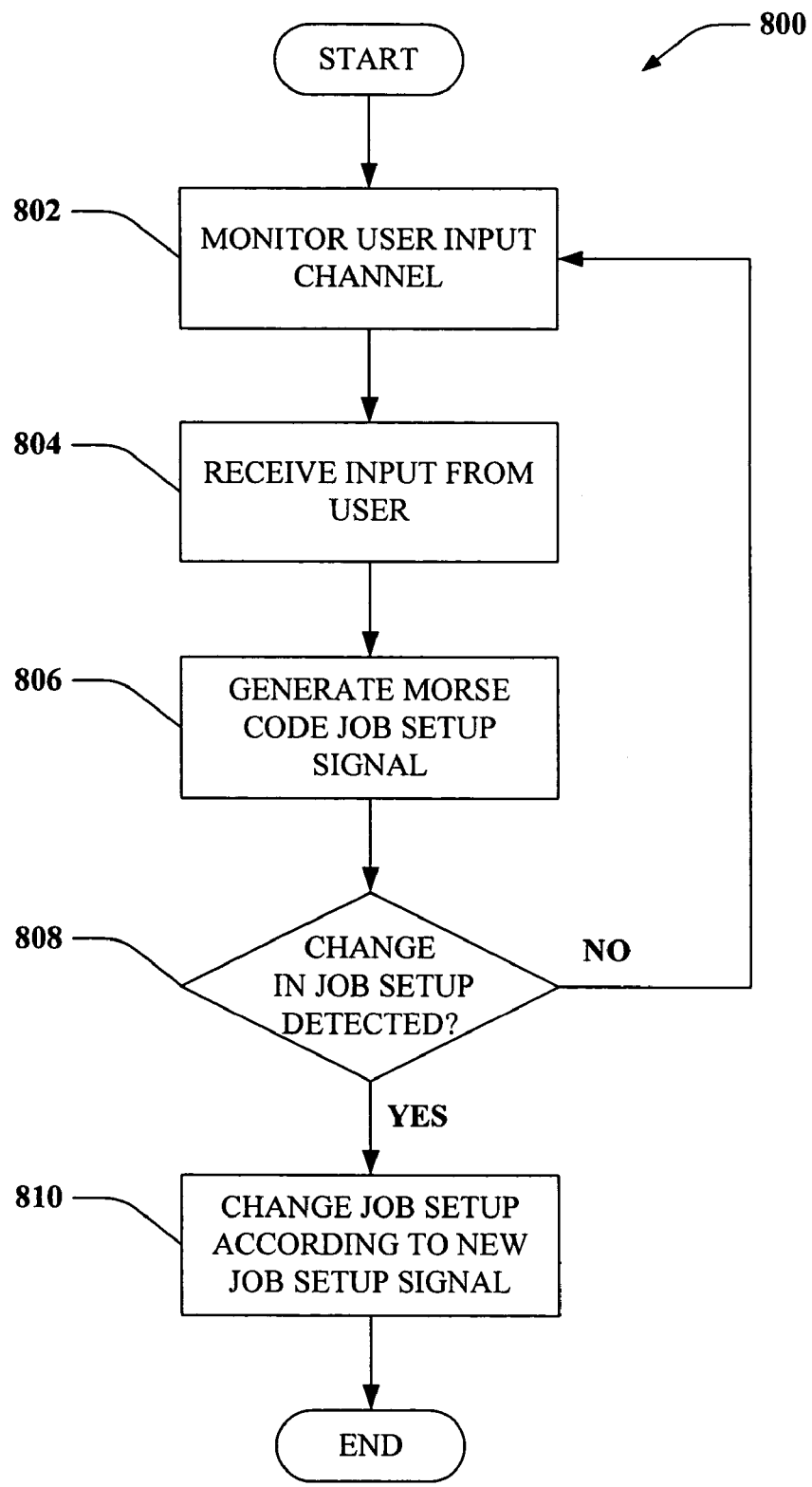
FIG. 8 is an illustration of a methodology 800 for changing a job setup in a camera sensor without requiring cessation of sensor operation and/or reprogramming of the sensor between jobs via a Morse Code signal, in accordance with an aspect of the subject invention.

Turning briefly to FIGS. 6, 7 and 8, methodologies that can be implemented in accordance with the present invention are illustrated. While, for purposes of simplicity of explanation, the methodologies are shown and described as a series of blocks, it is to be understood and appreciated that the present invention is not limited by the order of the blocks, as some blocks can, in accordance with the present invention, occur in different orders and/or concurrently with other blocks from that shown and described herein. Moreover, not all illustrated blocks may be required to implement the methodologies in accordance with the present invention.

FIG. 6 is an illustration of a methodology 600 for permitting a user to select a job setup change via transmission of a simple control signal to a camera sensor in which a plurality of job setups are stored in accordance with an aspect of the invention. At 602, a user can select a desired job setup, via, for example, a user interface (e.g., a graphical user interface such as a computer monitor, a PDA, a cell phone, . . . ) in order to generate a job setup selection signal. At 604, the job setup selection signal can be generated and transmitted to the sensor. The signal can comprise, for instance, voltages that can be interpreted by a processor in a camera sensor, and can be transmitted over extant I/O lines between a control component and the sensor.

At 606, the sensor can initiate the desired job setup selection in response to the received signal. For instance, if the sensor is running a default job setup such as determining pixel count via a binary imaging technique and receives a signal associated with a different job setup, then the sensor can initiate the job setup associated with the new signal, such as a gray scale imaging technique that permits feature detection, pattern matching, etc. Individual job setups can be programmed into a memory component in the sensor prior to sensor operation (e.g., during a single, initial setup phase), such that the sensor does not require reprogramming between jobs, but rather requires only a job setup selection signal to change from one job setup to the next.

FIG. 7 is an illustration of a methodology 700 for changing a job setup in a camera sensor without requiring cessation of sensor operation and/or reprogramming of the sensor between jobs, in accordance with an aspect of the subject invention. At 702, a user input device and/or channel can be monitored. User-entered information related to job setup selection changes can be received at 704. At 706, the desired job setup selection can be converted to a binary signal and transmitted to the sensor. The following provides a brief discussion of job setup signal selection and transmission.

For example, the sensor can be connected to a control component by two input lines, which permits a total of four possible input signals (e.g., 00, 01, 10, and 11) to be transmitted to the sensor, each of which can indicate a different application, or job. If desired, "00" can be assigned to a default job setup, such that when the sensor receives a 00 input, the default application will be executed. At 604, the signal associated with the selected job setup can be transmitted to the camera sensor. For example, if the user selects a job setup represented by a 00 control signal, then a LOW voltage signal across can be transmitted each of a first and second input line to the sensor to provide the default 00 signal thereto. Alternatively, if the user selects a job setup associated with a 01 signal, then a LOW signal can be transmitted across the first input line to the sensor and a HIGH signal can be transmitted across the second input line to provide the 01 signal to the sensor. It is to be appreciated that discussion herein of LOW and HIGH voltage levels is intended to indicate the voltage levels with respect to each other, and, thus, any suitable voltages can be employed as will be appreciated by one skilled in the art. Additionally, LOW and HIGH can be absolute values of voltages in order to permit the subject systems and methodologies to operate regardless of the polarity of the voltage signals.

Upon receipt of the job selection signal, a determination can be made regarding whether the signal indicates that a job setup change is desired at 708. For example, if a user inadvertently selects a default job setup when the default job setup is already running on the sensor, then a determination will be made that no job setup selection change has been detected and the method can revert to 702 for to await further user input. In this manner, the methodology 700 can ensure that sensor activity will not be subject to the inadvertent cessation and restarting of the same job setup.

However, if it is determined at 708 that the signal received is indicative of a job setup other than the job setup currently running on the sensor, then the sensor can initiate the selected job setup indicated by the job setup signal. For instance, if the sensor is running a default job setup (e.g., 00) such as determining pixel count via a binary imaging technique and receives a 01 signal, then the sensor can initiate a job setup associated with the 01 signal, such as a gray scale imaging technique that permits feature detection, pattern matching, etc. Individual job setups can be programmed into a memory component in the sensor prior to sensor operation (e.g., during a single, initial setup phase), such that the sensor does not require reprogramming between jobs, but rather requires only a setup selection signal to change from one job setup to the next.

Moreover, a header or prefix can be attached to the job selection signal in order to alert the sensor that the immediately following input relates to job selection and/or changes thereto. It is to be appreciated that the subject invention is not limited to two input lines and thus four job setup configurations, but rather can have any suitable number of input lines (e.g., 3, 4, 5, . . . ) and a corresponding number of job setup configurations as permitted by the associated number of input signal combinations.

FIG. 8 illustrates a methodology 800 for changing a job setup in a camera sensor without requiring cessation of sensor operation and/or reprogramming of the sensor between jobs via a Morse Code signal, in accordance with an aspect of the subject invention. At 802, a user input channel associated with a user input device can be monitored. User-entered information related to job setup selection changes can be received at 804. At 806, the desired job setup selection can be converted to a Morse Code signal and transmitted to the sensor. For example, the job setup selection can be formatted in Morse Code if desired, such that various job setups can be associated with Morse numerals, letters, words, etc. For instance, a default job setup can be associated with a Morse "0" (e.g., "- - - - -"), such that when a signal comprising five dashes is received by the sensor, the sensor can initiate the default job setup. Accordingly, a plurality of other job setups can be assigned respective integer values that can be represented in Morse Code in order to facilitate changing a job setup in the sensor without having to reprogram the sensor between jobs. It is to be appreciated that the subject invention can employ either or both of International Morse Code and American Morse Code, depending on user's preference, and that transmission via either Morse format can be selectable by the user.

At 808, a determination can be made regarding whether the received signal is indicative of a job setup selection change, as set forth above with respect to FIG. 7. If no change in job setup selection is detected at 808, then the method can revert to 802 for continued monitoring of user input. Alternatively, if it is determined at 808 that a job setup change is desired, then the method can proceed to 810, where the selected job setup is retrieved from a job setup database within associated with the sensor and is initiated accordingly. Individual job setups can be programmed into a memory component in the sensor prior to sensor operation (e.g., during a single, initial setup phase), such that the sensor does not require reprogramming between jobs, but rather requires only a setup selection signal to change from one job setup to the next.

Figure 9:
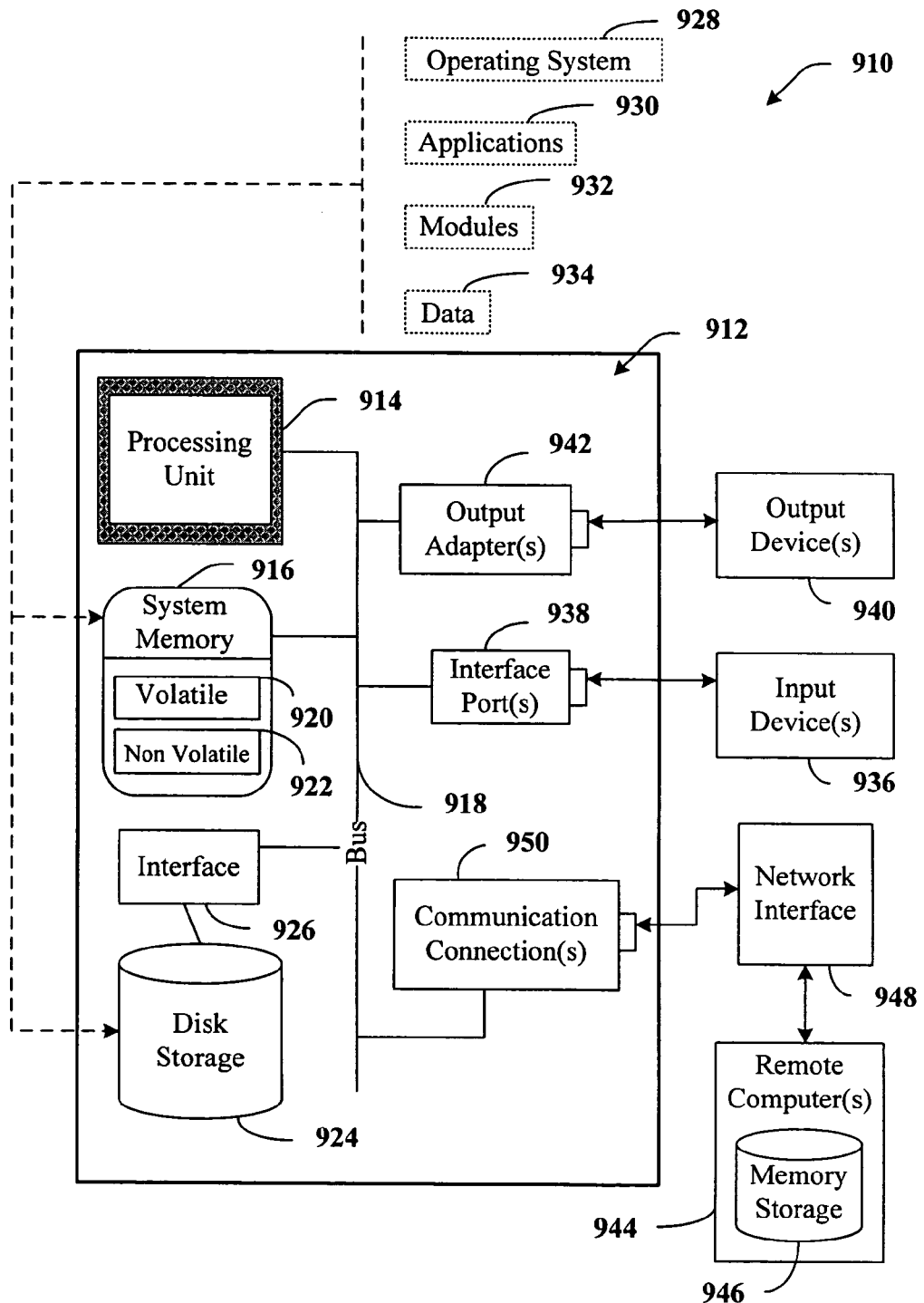
FIGS. 9 and 10 are illustrations of exemplary operating environments 900 and 1000 that can be employed in connection with the subject invention.
Figure 10:
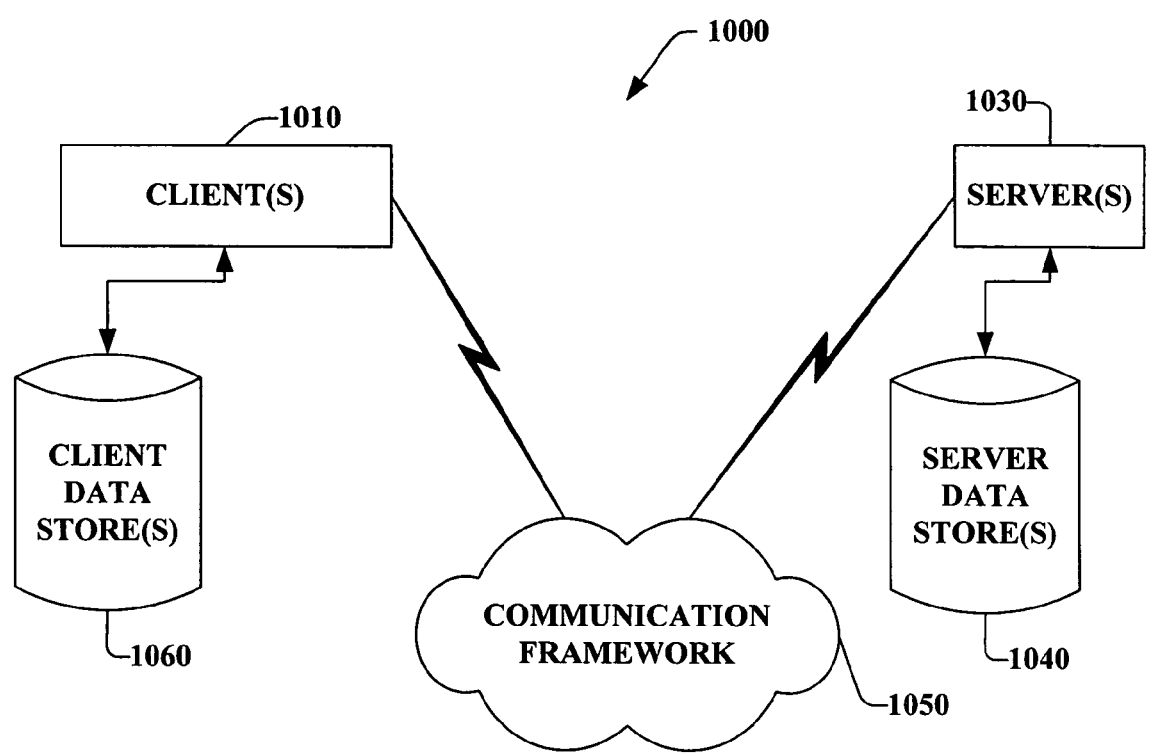

In order to provide a context for the various aspects of the invention, FIGS. 9 and 10 as well as the following discussion are intended to provide a brief, general description of a suitable computing environment in which the various aspects of the present invention can be implemented. While the invention has been described above in the general context of computer-executable instructions of a computer program that runs on a computer and/or computers, those skilled in the art will recognize that the invention also can be implemented in combination with other program modules. Generally, program modules include routines, programs, components, data structures, etc. that perform particular tasks and/or implement particular abstract data types. Moreover, those skilled in the art will appreciate that the inventive methods can be practiced with other computer system configurations, including single-processor or multiprocessor computer systems, mini-computing devices, mainframe computers, as well as personal computers, hand-held computing devices, microprocessor-based or programmable consumer electronics, and the like. The illustrated aspects of the invention can also be practiced in distributed computing environments where tasks are performed by remote processing devices that are linked through a communications network. However, some, if not all, aspects of the invention can be practiced on stand-alone computers. In a distributed computing environment, program modules can be located in both local and remote memory storage devices.

With reference to FIG. 9, an exemplary environment 910 for implementing various aspects of the invention includes a computer 912. The computer 912 includes a processing unit 914, a system memory 916, and a system bus 918. The system bus 918 couples system components including, but not limited to, the system memory 916 to the processing unit 914. The processing unit 914 can be any of various available processors. Dual microprocessors and other multiprocessor architectures also can be employed as the processing unit 914.

The system bus 918 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 916 includes volatile memory 920 and nonvolatile memory 922. The basic input/output system (BIOS), containing the basic routines to transfer information between elements within the computer 912, such as during start-up, is stored in nonvolatile memory 922. By way of illustration, and not limitation, nonvolatile memory 922 can include read only memory (ROM), programmable ROM (PROM), electrically programmable ROM (EPROM), electrically erasable ROM (EEPROM), or flash memory. Volatile memory 920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Computer 912 also includes removable/non-removable, volatile/non-volatile computer storage media. FIG. 9 illustrates, for example a disk storage 924. Disk storage 924 includes, but is not limited to, devices like a magnetic disk drive, floppy disk drive, tape drive, Jaz drive, Zip drive, LS-100 drive, flash memory card, or memory stick. In addition, disk storage 924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 924 to the system bus 918, a removable or non-removable interface is typically used such as interface 926.

It is to be appreciated that FIG. 9 describes software that acts as an intermediary between users and the basic computer resources described in suitable operating environment 910. Such software includes an operating system 928. Operating system 928, which can be stored on disk storage 924, acts to control and allocate resources of the computer system 912. System applications 930 take advantage of the management of resources by operating system 928 through program modules 932 and program data 934 stored either in system memory 916 or on disk storage 924. It is to be appreciated that the subject invention can be implemented with various operating systems or combinations of operating systems.

A user enters commands or information into the computer 912 through input device(s) 936. Input devices 936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 914 through the system bus 918 via interface port(s) 938. Interface port(s) 938 include, for example, a serial port, a parallel port, a game port, and a universal serial bus (USB). Output device(s) 940 use some of the same type of ports as input device(s) 936. Thus, for example, a USB port may be used to provide input to computer 912, and to output information from computer 912 to an output device 940. Output adapter 942 is provided to illustrate that there are some output devices 940 like monitors, speakers, and printers, among other output devices 940, which require special adapters. The output adapters 942 include, by way of illustration and not limitation, video and sound cards that provide a means of connection between the output device 940 and the system bus 918. It should be noted that other devices and/or systems of devices provide both input and output capabilities such as remote computer(s) 944.

Computer 912 can operate in a networked environment using logical connections to one or more remote computers, such as remote computer(s) 944. The remote computer(s) 944 can be a personal computer, a server, a router, a network PC, a workstation, a microprocessor based appliance, a peer device or other common network node and the like, and typically includes many or all of the elements described relative to computer 912. For purposes of brevity, only a memory storage device 946 is illustrated with remote computer(s) 944. Remote computer(s) 944 is logically connected to computer 912 through a network interface 948 and then physically connected via communication connection 950. Network interface 948 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 950 refers to the hardware/software employed to connect the network interface 948 to the bus 918. While communication connection 950 is shown for illustrative clarity inside computer 912, it can also be external to computer 912. The hardware/software necessary for connection to the network interface 948 includes, for exemplary purposes only, internal and external technologies such as, modems including regular telephone grade modems, cable modems and DSL modems, ISDN adapters, and Ethernet cards.

FIG. 10 is a schematic block diagram of a sample-computing environment 1000 with which the subject invention can interact. The system 1000 includes one or more client(s) 1010. The client(s) 1010 can be hardware and/or software (e.g., threads, processes, computing devices). The system 1000 also includes one or more server(s) 1030. The server(s) 1030 can also be hardware and/or software (e.g., threads, processes, computing devices). The servers 1030 can house threads to perform transformations by employing the subject invention, for example. One possible communication between a client 1010 and a server 1030 can be in the form of a data packet adapted to be transmitted between two or more computer processes. The system 1000 includes a communication framework 1050 that can be employed to facilitate communications between the client(s) 1010 and the server(s) 1030. The client(s) 1010 are operably connected to one or more client data store(s) 1060 that can be employed to store information local to the client(s) 1010. Similarly, the server(s) 1030 are operably connected to one or more server data store(s) 1040 that can be employed to store information local to the servers 1030.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:
   a control component that receives an input changing a first job setup in a camera sensor to a second job setup in the camera sensor and generates a job setup signal based at least in part on the input; and
   a camera sensor, operatively coupled to the control component by one or more input/output (I/O) connections, wherein the camera sensor that receives the job setup signal across at least one of the one or more I/O connections, wherein the camera sensor comprises a job setup data store that stores a plurality of job setups, wherein the plurality of job setups comprises the first job setup and the second job setup, wherein the camera sensor retrieves the second job setup from the job setup data store, terminates the first job setup and executes the second job setup in response to the job setup signal.

2. The system of claim 1, wherein the first job setup and the second job setup require the camera sensor to inspect a product of a same type.

3. The system of claim 1, further comprising a user interface that provides the input to the control component.

4. The system of claim 1, wherein the control component generates the job setup signal in binary format.

5. The system of claim 4, wherein the plurality of job setups further comprises a default job setup, wherein a binary signal value representing the integer "0" is assigned to the default job setup.

6. The system of claim 1, wherein the control component generates the job setup signal formatted in Morse Code.

7. The system of claim 6, wherein the Morse code format is American Morse Code.

8. The system of claim 6, wherein the Morse Code format is International Morse Code.

9. A method, comprising:
   receiving a job setup signal at a camera sensor comprising at least one processor across at least one extant input/output (I/O) connection, wherein the job setup signal indicates changing a first job setup in the camera sensor to a second job setup in the camera sensor;
   retrieving the second job setup from a job setup data store within the camera sensor, wherein the job setup data store stores a plurality of job setups;
   terminating the first job setup; and
   executing the second job setup.

10. The method of claim 9, wherein executing the second job setup further comprises employing the second job setup to inspect a single type of product.

11. The method of claim 9, further comprising storing the plurality of job setups in the job setup data store during a single pre-operation programming phase.

12. The method of claim 9, wherein the at least one extant I/O line connects the camera sensor to a control component.

13. The method of claim 9, wherein receiving the job setup signal further comprises receiving at least one binary value representing the second job setup.

14. The method of claim 13, wherein receiving the job setup signal further comprises receiving the at least one binary value via at least one electrical pulse transmitted over the at least one extant I/O line.

15. The method of claim 9, wherein receiving the job setup signal further comprises receiving at least one Morse Code signal.

16. The method of claim 15, wherein the Morse Code is American Morse Code.

17. The method of claim 15, wherein the Morse Code is International Morse Code.

18. The method of claim 15, further comprising permitting a user to select at least one of American Morse Code and International Morse Code as a format for transmitting the job setup signal.

19. The method of claim 15, wherein receiving the job setup signal further comprises receiving at least one integer value in Morse Code.

20. The method of claim 19, wherein the at least one integer value is associated with the second job setup.

21. The method of claim 9, wherein receiving the job setup signal further comprises receiving a simple message indicative of the second job setup.

22. A camera sensor, comprising:
- an interface connecting at least one existing input/output (I/O) line, wherein the camera sensor receives a job setup signal across the I/O line, wherein the job setup signal indicates changing a first job setup to a second job setup;
- a job setup data store configured to store a plurality of job setups, wherein the plurality of job setups comprises the first job setup and the second job setup; and
- at least one processor that retrieves the second job setup from the job setup data store, terminates a the first job setup and executes the second job setup.

23. The camera sensor of claim 22, wherein the job setup signal is formatted in a binary format.

24. The camera sensor of claim 22, wherein the job setup signal is formatted in a Morse Code format.

25. The camera sensor of claim 22, wherein the camera sensor interfaces with a graphical user interface that presents a selectable list of the plurality of job setups.

\* \* \* \* \*